United States Patent [19]

Jackson et al.

[11] 4,281,581

[45] Aug. 4, 1981

[54] HIGH-STRENGTH BLIND RIVET

[76] Inventors: Liam R. Jackson, 183 Alpine St.;
Allan H. Taylor, 30 Huxley Pl., both of Newport News, Va. 23606

[21] Appl. No.: 78,035

[22] Filed: Sep. 24, 1979

[51] Int. Cl.³ .............................................. F16B 19/12
[52] U.S. Cl. ...................................................... 411/19
[58] Field of Search .......................... 85/65, 70, 71, 37

[56] References Cited

U.S. PATENT DOCUMENTS

| 2,429,239 | 10/1947 | Rogers | 85/65 |
| 2,438,976 | 4/1948 | Lautmann | 85/65 |
| 3,534,419 | 10/1970 | Deans et al. | 85/70 X |
| 3,657,955 | 4/1972 | McKay | 85/70 |

FOREIGN PATENT DOCUMENTS

| 737480 | 7/1943 | Fed. Rep. of Germany | 85/65 |
| 1906989 | 2/1973 | Fed. Rep. of Germany | 85/65 |
| 941091 | 6/1948 | France | 85/65 |

*Primary Examiner*—Ramon S. Britts

[57] ABSTRACT

A novel blind rivet is provided wherein the blind head is upset by a pin driven from the exposed side into a core of soft metal contained by a closed tube end which is selectively thinned to result in controlled deformation due to the internal pressure created by compressing the soft core. The closed tube end upon expanding to a predetermined shape is transformed into the blind head.

This rivet offers high strength, leak-free joining. Consistant controlled snug fitting assembly is offered. The rivet is suited to installation by a tool that prevents forming loads from being transferred to the members being joined. Moreover, the rivet has lower weight and cost while providing a smoother exposed surface than prior art blind rivets.

4 Claims, 5 Drawing Figures

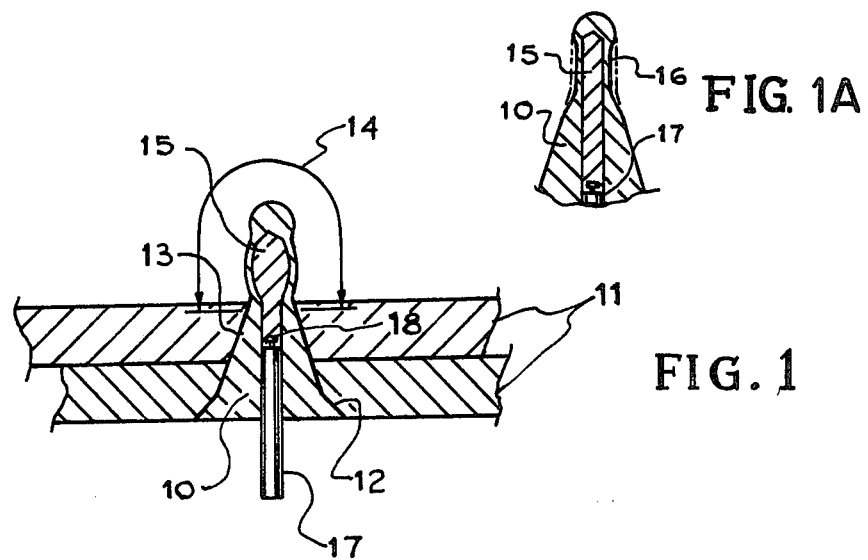
FIG. 1A
FIG. 1
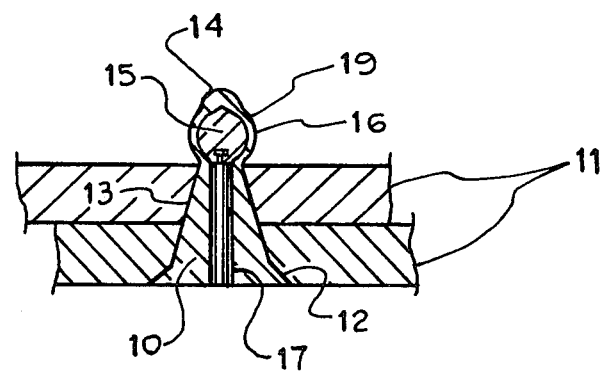
FIG. 2

HIGH-STRENGTH BLIND RIVET

ORIGIN OF THE INVENTION

The invention described herein was made by an employee of the United States Government and by an employee of a Contractor of the United States Government and may be manufactured or used by or for the Government for Governmental purposes without the payment of any royalties thereon or therefor.

BACKGROUND OF THE INVENTION

The present invention relates generally to a rivet which can be easily installed blind (from one side) and obtain both high shear and high tensile strengths; this is accomplished by a unique method of forming the upset head thereof.

Previous blind fastening systems incorporate a shaft or pin through the center of the fastener, which when pulled or in some instances driven inward upsets the end of the fastener on the inaccessible side or contains an explosive which upsets the blind head. Prior art has several shortcomings. First the pull-through or driven pin rivets are not suitable for pressure vessel applications since the pin hole penetrates completely through the shank, thus such rivets are not pressure tight. With the pull-through rivet the pin not only forms the head but deforms the body in order to fill the hole. The magnitude of these deformations is controlled by the tensile strength of the shaft or of a torque sensing driver or by the explosive charge all of which devices do not allow good quality control. The fasteners are heavier than conventional rivets or threaded tapered pins or bolts. These fasteners usually protrude into the hole further than conventional attachments due to the material required for the enlarged pin end and deformed head, which can create clearance problems as well as an associated weight penalty. The external head of the pull-through rivet is usually coarse and rough due to the broken pulled shaft. These fasteners are characterized by low strength and high cost due to the poor control of the forming process and excess material and components. There is therefore a definite need for a blind rivet with positive control of the forming of the blind head that does not have a hole completely through the shank.

Accordingly, it is an object of the present invention to provide a new and improved blind rivet for fastening two or more members.

Another object of the invention is to provide a strong fastener for both tensile and shear loads.

Another object of the invention is to provide a leak-free rivet.

Another object of the invention is to provide consistant head forming, a snug shank fit in the hole, and a tight fit between the rivet heads and the members being joined.

An additional object of the present invention is to retain all forces required to form the blind head within the rivet and a riveting tool instead of in the members being joined.

Still other objects of the present invention are to provide a low weight and low cost rivet that has a smooth exposed head after installation.

The foregoing and other objects of the present invention are attained by a unique method of upsetting the blind head. The upsetting is accomplished by plastically deforming a ductile material, such as soft aluminum, contained within a cavity by mechanically induced pressure. The ductile material is compressed by a force applied to a drive pin which protrudes from the preformed head prior to installation. The compression of the material within the cavity provided in the closed tubular end of the rivet generates a uniform internal pressure. This pressure will cause the blind head of the rivet to yield at the region of highest stress. This region is controlled by selectively thinning the walls of the cavity provided within the closed tubular end of the rivet. This end of the rivet is also annealed to foster plastic deformation. The total deformation of the blind head is controlled by the volume of the protruding part of the pin. When the pin is driven flush with the surface of the preformed head the upset head is completely formed.

The addition of a collar between the blind head and the members being joined provides increased tensile strength because of the improved support for the loaded side of the blind head.

An integrally formed hollow headed pin on the preformed head enables use of a riveting tool that forms the blind head without applying force to the members being joined. This feature is particularly suited to joining thin members not capable of supporting the driven pin forces that normally occur for rivets without the preformed headed pin. After riveting the preformed headed pin may be removed to provide a smooth or flush rivet head.

BRIEF DESCRIPTION OF DRAWINGS

A more complete appreciation of the invention and many of the attendant advantages thereof will be more readily apparant as the same becomes better understood by reference to the following detailed description when considered in connection with the accompanying drawings wherein:

FIG. 1 is a sectional view of the rivet which has a tapered shank and flush countersunk preformed head installed in a predrilled hole provided in the members being joined. The blind head has not been completely formed. The encircled detail FIG. 1A shows the thinned closed tubular end prior to a slight preforming.

FIG. 2 is a sectional view of the same rivet as in FIG. 1 installed, but now joining the members, because the blind head has been completely formed.

DETAILED DESCRIPTION OF THE DISCLOSURE

Figure 3:
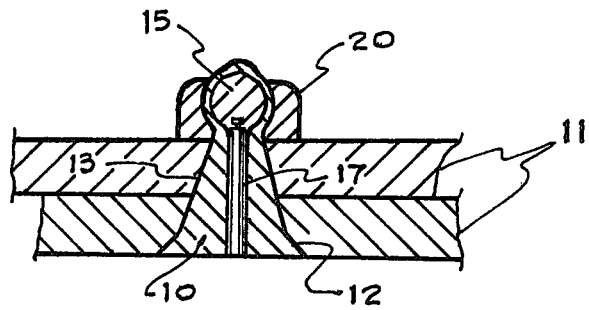
FIG. 3 is a sectional view showing a preinstalled collar between the blind head and members being joined.

Referring now to the drawing, FIG. 1, illustrates the preferred embodiment of the present invention, generally designated by reference numeral 10 that is used to join members 11. FIG. 1 depicts the preformed countersunk flush head 12, the tapered shank 13, the closed tubular annealed end of the rivet 14, the ductile material (for instance, soft aluminum) 15, the selective thinning of the closed tubular end of the rivet 16, and the drive pin 17. In addition, FIG. 1 shows an integral headed pin 18 formed on the inner end of the drive pin 17 that is pressed into the soft material 15 during manufacture to retain the drive pin for handling ease. The soft material 15 is pressed into the hole that was drilled into the shank to form the closed tubular end 14 of the rivet. The closed tubular end is slightly enlarged in the thinned region during manufacture to retain the soft material during handling. The selective thinning 16 may be the preferred external thinning 16 or internal thinning of the closed tubular end or a combination of these means. FIG. 2 shows the upset blind head of the rivet. The volume of the closed end of the rivet 14 is increased during forming by the volume of the drive pin extending out of the preformed head 12 prior to forming. The soft material 15 acts as an incompressible medium allowing the displaced volume of the drive pin to expand the closed tubular end 14 of the rivet. As force is applied to the drive pin 17, the soft material 15 is compressed resulting in a uniform internal pressure within the closed tubular end 14 of the rivet. This pressure will cause the material to yield at the region of highest stress. This region is controlled by the selective thinning of the walls 16 of the closed end 14 of the rivet. The total deformation of the blind head 19 is controlled by the volume of the protruding part of the pin 17, or the pin volume displaced as the pin 17 is driven into the rivet to the depth required to make the pin 17 flush with the preformed head 12.

The drive pin 17 fills the rivet shank 13 which is tapered so that as the blind head 19 is formed the shank 13 is pulled snugly into the holes provided in members 11. Consequently, the rivet completely fills the holes, and the shank 13 is filled by the pin 17, so a high shear strength results. High tensile strength is provided by the tight fit of the rivet heads on the members 11 being joined; that is, as the blind head is being formed it presses on the upper surface of upper member 11, thereby eliminating any looseness common with some prior art blind drive rivets. A further increase in tensile strength will result by use of the preinstalled collar 20 shown in FIG. 3. The collar 20 provides greater bearing area between the blind head 19 and the members 11 being joined. Thus the local stresses are lowered resulting in higher tensile strength.

Figure 4:
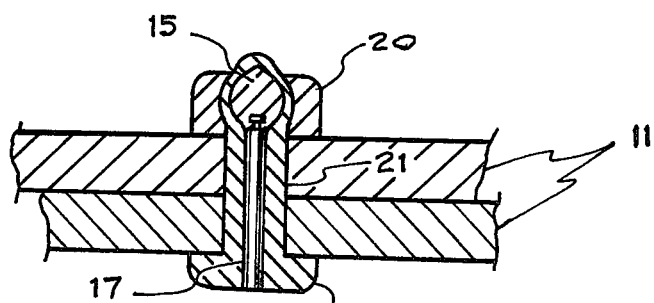
FIG. 4 is a sectional view showing a rivet which has a cylindrical shank and a preformed button head and with a preinstalled collar between the blind head and members that have been joined.

The present invention is not limited to use with tapered shank 13 and countersunk flush head 12 rivets; that is, the novel means of forming the blind head may be applied to other shank and head types as shown in FIG. 4. As seen in FIG. 4, the shank 21 is cylindrical and the head 22 is a button head.

Figure 5:
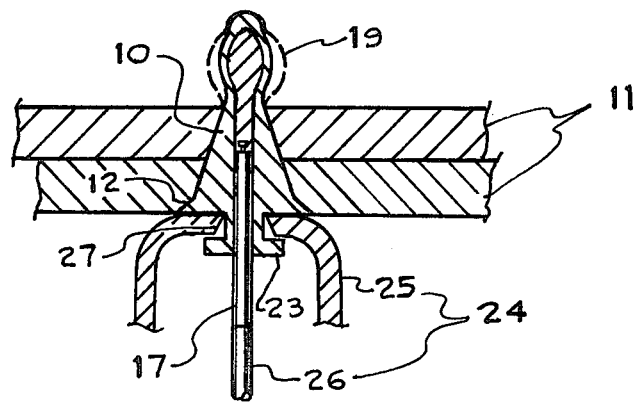
FIG. 5 is a sectional view of the rivet shown in FIG. 1 except a hollow headed pin is shown as an integral part of the preformed head. A riveting tool is shown wherein clamps engage the integral hollow headed pin and a mandrel drives the drive pin to a depth flush with the counter sunk preformed head through the hollow headed pin. Thus after forming the integral hollow headed pin may be removed to offer a smooth surface.

FIG. 5 shows a hollow headed pin 23 preformed as an integral part of the preformed head 12. The purpose of this headed pin 23 is to enable forming the blind head 19 with a riveting tool 24 that retains all forces required to form the blind head 19 within the riveting tool 24 and the rivet 10. That is, no forming forces are transmitted to the members 11 being joined. This feature is particularly useful when members 11 are thin or designed to support lower loads than would result from forming the blind head 19 without use of the headed pin 23, such as shown in FIGS. 1 and 2. The riveting tool 24 consists of opposing clamps 25 that grip the headed pin 23 to react the force applied to the drive pin 17 by the mandrel 26.

The mandrel is driven by a pneumatic piston until the drive pin is flush with the face of the preformed flush head 12. The clamps 25, which have sharpened ends 27, may be squeezed to snip off the headed pin 23 after forming the blind head 19.

It is thus seen that the present invention provides a new and novel blind rivet that is strong and leak free since the blind head is not penetrated for the drive pin and since forming the blind head pulls the shank snugly into the holes. The present invention provides a means of attaining consistant forming of the blind head and tightness of the heads against the members being joined. The present invention also may be installed by a riveting tool that imparts no forces on the members being joined as the blind head is being formed. Finally, the present invention provides a smaller, lighter blind head, fewer parts and a smoother exposed head than prior art blind rivets.

Although the invention has been described relative to specific embodiments thereof, these are to be considered as exemplary only and not limiting. For example, although the invention has been described for countersunk flush heads and button heads, it is not so limited and is equally applicable to any type head. Additionally, the invention is constructed of appropriate metals in dimensions normally found in blind rivets. There are thus, numerous variations of the present invention that will be readily apparant to those skilled in the art in the light of the above teachings without departing from the spirit and scope of the appended claims that the invention may be practiced otherwise than as specifically described herein.

What is claimed as new and desired to be secured by Letters Patent of the United States is:

1. A blind rivet for use as a means for joining two or more members comprising:

a closed tubular end having selectively thinned walls defining a constant thickness from the outside, said closed tubular end being annealed and sized to fit through predrilled holes in the members to be joined, a soft essentially incompressible material being enclosed by said tubular end of said rivet, a snug fitting drive pin protruding from said rivet and being used to compress said soft material when driven flush with a preformed rivet head thereby creating internal pressure which in turn deforms said closed tubular end of said rivet or upsets the blind head to a predetermined size and shape, a hollow shank used to provide a snug fit into the predrilled holes which also encloses said soft material and that portion of said drive pin inside said rivet prior to forming, a preformed rivet head that is penetrated by said drive pin; and, a headed pin on the inner end of said drive pin having a head portion that is considerably smaller in diameter than said drive pin and having a shank portion connected to said drive pin of less diameter than said head portion, said headed pin being embedded in said soft material; to retain said drive pin in said soft material, said drive pin being pressed into said soft material during manufacture, which in turn enlarges said selectively thinned portion of said closed tubular end of said rivet to an outer diameter equal to or less than the said predrilled holes to retain the combination of said soft material and said drive pin, said selectively thinned portion thereby having a slightly bulged configuration.

2. A blind rivet of claim 1 wherein said hollow shank is tapered so that as said blind head is formed to its said predetermined size and shape said rivet being pulled tightly into said predrilled holes by the force exerted by said blind head on the members being joined.

3. A blind rivet of claim 1 including an unsplit collar preinstalled to the blind side of the members being joined wherein said rivet is inserted piror to forming said blind head to increase bearing area and to provide adequate clamping force between said blind head of said rivet and members being jointed.

4. A blind rivet of claim 1 wherein said preformed rivet head has a hollow integral headed pin that enables forming said blind head while permitting retention of said drive pin for high shear strength with a riveting tool wherein the forming forces are contained within said rivet and said riveting tool rather than the members being joined.

* * * * *